United States Patent [19]
Tsybulnik et al.

[11] 4,147,319
[45] Apr. 3, 1979

[54] SHOCK ABSORBER DEVICE

[76] Inventors: Isaak Tsybulnik, 6830 Sheridan Rd.;
Maikl Tsybulnik, 7008 N. Paulina,
both of Chicago, Ill. 60626

[21] Appl. No.: 824,812

[22] Filed: Aug. 15, 1977

[51] Int. Cl.² ............................................ F16M 13/00
[52] U.S. Cl. .................................. 248/582; 248/631;
248/638
[58] Field of Search .................... 248/20, 21, 22, 350,
248/358 R, 400; 267/119, 122, 123, 124

[56]  References Cited
U.S. PATENT DOCUMENTS

| | | | |
|---|---|---|---|
| 2,101,757 | 12/1937 | Schumacher | 267/64 R |
| 2,652,241 | 9/1953 | Williams | 248/21 X |
| 2,882,592 | 4/1959 | De Carbon | 267/64 R X |
| 3,036,844 | 5/1962 | Vogel | 248/400 X |
| 3,146,979 | 9/1964 | Keetch | 248/20 |
| 3,586,272 | 6/1971 | Pestell | 248/22 |
| 3,784,146 | 1/1974 | Matthews | 248/22 X |

FOREIGN PATENT DOCUMENTS

| | | | |
|---|---|---|---|
| 1494326 | 7/1967 | France | 248/400 |
| 610958 | 10/1948 | United Kingdom | 248/20 |

*Primary Examiner*—William H. Schultz
*Attorney, Agent, or Firm*—David D. Kaufman

[57] ABSTRACT

A shock absorber device is provided including a lower cup-shaped part covered by a first diaphragm to define an air chamber and a second diaphragm is disposed in spaced relation above the first diaphragm to define an oil chamber with a piston element being engaged with the second diaphragm to operate through the oil to control pressure applied from the first diaphragm to air in the air chamber. The piston element supports a plate through balls seated in recesses such that horizontal displacement of the plate is translated into vertical displacement of the piston element, the plate being arranged to support a machine to be supported, or a portion thereof. The area of the piston element and the area of the first diaphragm have a ratio therebetween such as to match the requirements of a particular machine and to minimize transmission of shocks and vibrations.

7 Claims, 5 Drawing Figures

SHOCK ABSORBER DEVICE

This invention relates to a shock absorber device and more particularly to a shock absorber device which is highly efficient in minimizing the transmission of shocks and vibrations between a machine and a support surface and which is relatively simple in construction and operation and readily and economically manufacturable while being rugged and durable. The device is very compact and can be readily matched to the requirements of a particular machine.

BACKGROUND OF THE PRIOR ART

The support of machinery presents problems especially when the machinery has parts which operate with impacts or which oscillate to produce shocks and vibrations in the frame structure of the machinery. Such problems are of increased magnitude when it is desired to support the machinery on elevated floors and when the attempted solution is to fixedly secure the frame of the machinery to the floor because the resulting transmission of shocks and vibrations to the floor can cause damage thereto and to the supporting structure therefor.

Shock absorbers heretofore proposed for support of machinery have not been entirely satisfactory. In many cases, prior art arrangements have been unduly complicated and expensive and they have not been such as to obtain adequate isolation, particularly with respect to low frequency components and transient shocks of high amplitude. Prior art arrangements have also been unduly large in size and have been subject to failure of parts, especially in the case of constructions having exposed bellows and the like.

As an example of prior art disclosures, the Wendes U.S. Pat. No. 2,171,774 discloses a vibration damping device wherein a vibratory member extends into a channel defined by a C-shaped member with a plurality of resilient bodies between the vibratory member and the sides of the channel and with the vibration absorbing capacity of the bodies being described as being separately controllable.

The French et al U.S. Pat. No. 2,572,919 discloses a vibration damping system for optical observation instruments which includes springs, dashpots and an arrangement incorporating balls riding between cupped and inverted cupped parts to provide for lateral yield.

The Brown U.S. Pat. No. 2,605,066 discloses an air spring for heavy machinery using a bellows between a load plate and the upper end of a cylinder with a piston connected to the load plate being movable in liquid in the lower portion of the cylinder and with valves associated with the piston to meter liquid flow in response to downward movement and to allow free flow in response to upward movement.

The Williams U.S. Pat. No. 2,652,241 discloses a strut platform support in which a hydraulic fluid is contained between a pair of membranes to provide a hydraulic support and in which tiltable studs are provided to accommodate lateral movements.

The Keetch U.S. Pat. No. 3,146,979 discloses an arrangement in which balls are disposed between upwardly and downwardly facing circular concave raceways to translate horizontal forces into vertical forces with a ring member of a solid resilient materal being provided for absorbing vertical vibrations and shocks.

The May U.S. Pat. No. 3,281,101 discloses a levelable load mount for a machine susceptible to physical distortion when a multi-point support thereof fails to provide a proper levelling action. A plurality of pneumatic mounts are provided to which air is supplied through automatically controlled valving.

The Leary U.S. Pat. No. 3,425,652 discloses a vibration controlling mounting apparatus in which balls of elastomeric material are seated in semi-spherical sockets in the lower face of a mounting plate and are engaged in cups supported on shafts within annular collars of resilient material.

The Richard U.S. Pat. No. 3,730,463 discloses shock absorbing mountings in which a pair of ball races are disposed between the lower and upper horizontal planar faces of an apparatus support plate and upper and lower horizontal planar surfaces of a fixed support, for the purpose of providing low friction horizontal movement which is restrained only by a self-centering annular rubber body.

The Byers U.S. Pat. No. 3,771,270 discloses earthquake damage prevention devices using ball bearings to allow horizontal translational movements, the ball bearings being disposed between facing surfaces which are contoured to provide a centering action.

SUMMARY OF THE INVENTION

This invention was evolved with the general object of overcoming the disadvantages of prior art arrangements and of providing a shock absorber which is highly effective in minimizing transmission of shocks and vibrations from machines to supporting structures therefor while being relatively simple and inexpensive in construction, rugged and durable.

Another object of the invention is to provide shock absorbers which can be readily matched to the characteristics of a particular machine to minimize transmission of shocks and vibrations generated thereby.

A further object of the invention is to provide shock absorbers which are small in size and weight while being highly effective.

In accordance with this invention, a device is provided which is arranged for disposition on a floor or other support surface and which includes a chamber for a compressible fluid, preferably air, with an upper wall of the chamber being defined by a diaphragm which is coupled to a machine supported by the device, with a coupling such that a certain displacement ratio is obtained between vibratory displacement of the machine and the resulting displacement of the diaphragm. Means are provided for injecting air, or other compressible fluid, into the chamber for support of the machine with the pressure in the chamber being proportional to the force applied to the device from the weight of the machine. The displacement ratio and the dimensions of the chamber are so related to the frequency of vibration of the machine as to minimize transmission of vibrations to the support surface.

In accordance with an important feature, a coupling is provided between the diaphragm and the machine such that a displacement multiplying effect is obtained with the displacement of the machine being greater than that of the diaphragm. With this arrangement, a substantially larger compliance can be obtained without increasing the size of the device or, conversely, a smaller device can be used to obtain the same compliance as would be obtained by a device having a unity ratio. It is also possible to readily match the device to a particular machine by selecting the proper ratio according to the type or frequency of shocks and vibrations generated by the particular machine.

In accordance with specific features of the invention, the displacement ratio is obtained through the use of a hydraulic coupling between a piston element and the diaphragm which defines a wall of the compressible fluid chamber. Preferably, the piston element is engaged with a second diaphragm defining the upper wall of a hydraulic fluid chamber the lower wall of which is defined by the diaphragm which defines an upper wall of the compressible fluid chamber. Mounting rings are provided for clamping engagement with peripheral edge portions of the diaphragms to obtain reliable seals and to protect the diaphragms. Structures are also provided for guiding the piston element for movement and for limiting movement thereof.

Another specific feature is in the provision of a mounting arrangement by which horizontal components of movement are translated into vertical movement in a manner such that the device can be effective as to forces applied in any direction but without substantially increasing the overall size of the device.

This invention contemplates other objects, features and advantages which will become more fully apparent from the following detailed description taken in conjunction with the drawings.

DESCRIPTION OF A PREFERRED EMBODIMENT

Figure 1:
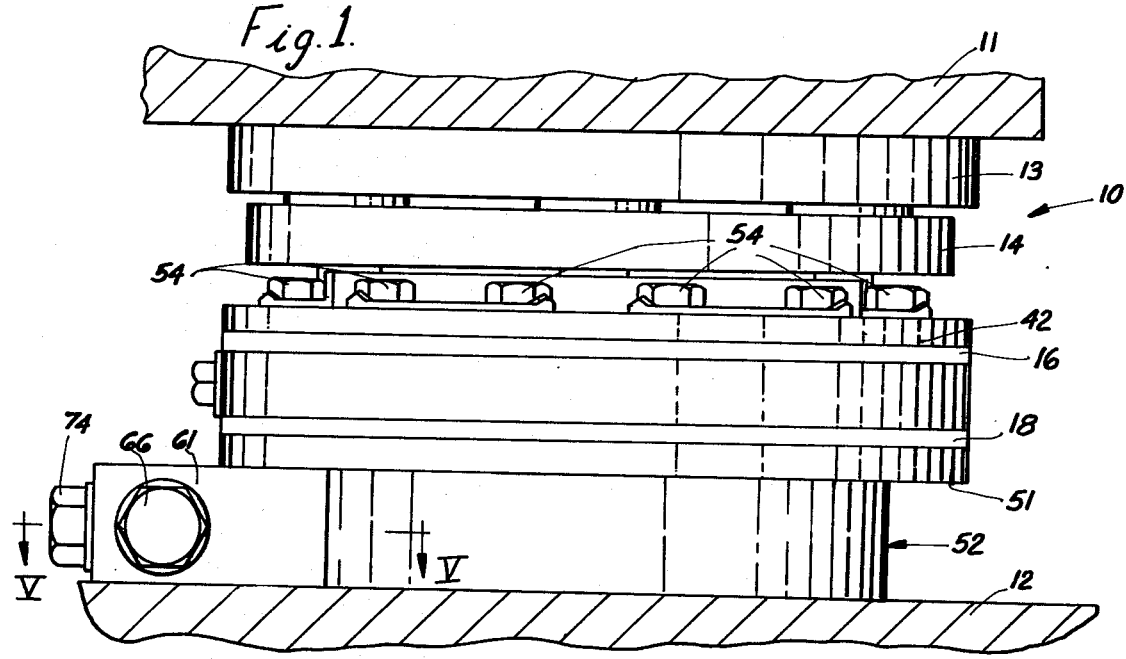
FIG. 1 is a side elevational view of a shock absorber constructed in accordance with the invention.
Figure 2:
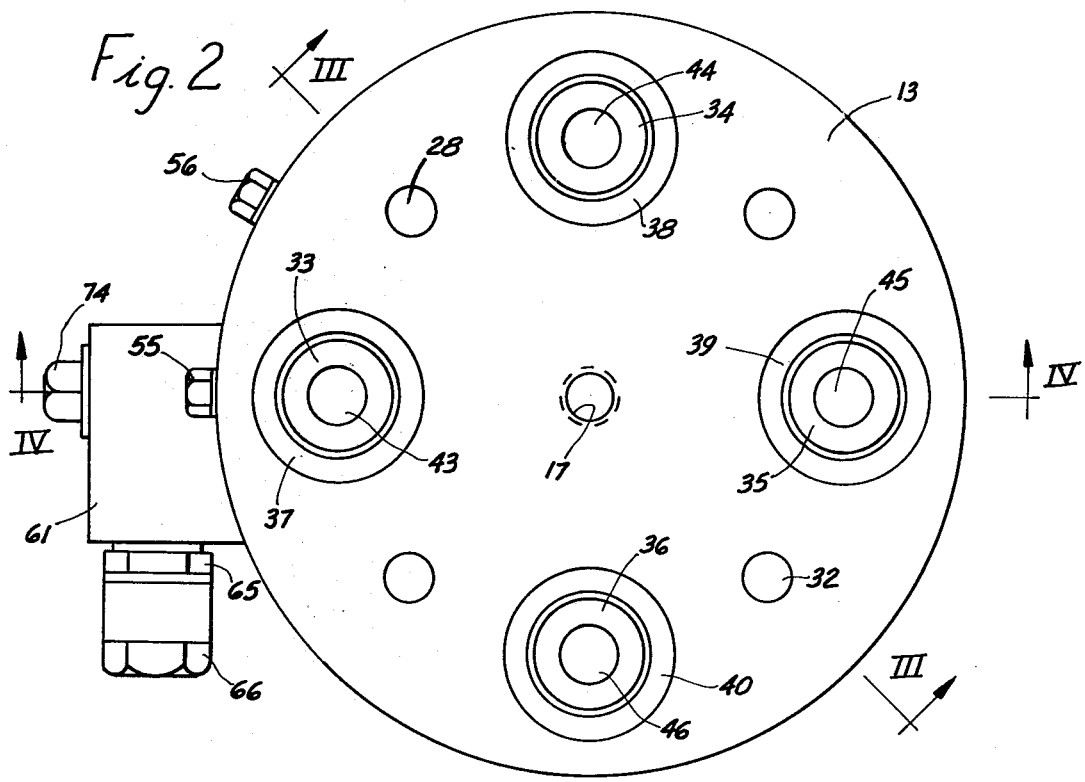
FIG. 2 is a top plan view of the shock absorber of FIG. 1.

Reference numeral 10 generally designates a shock absorber constructed in accordance with the principles of the invention and shown in FIG. 1 disposed under a portion of a supported element 11 and resting on a surface 12. Element 11 may for example be a machine used in a manufacturing operation and operative to develop shocks and vibrations in its frame structure during operation thereof and the illustrated portion may be a corner portion of the machine with additional devices like the device 10 being used to support the other corner portions of the machine. Surface 12 may be the surface of a factory floor, for example, and the purpose of the device 10 is to minimize transmission of shocks and vibrations to the surface 12 and to dampen and absorb shocks and vibrations and the energy thereof.

Device 10 includes a plate 13 supported on a member 14 having a downwardly projecting piston portion 15 engaging the upper surface of a diaphragm 16. The plate 13 is disposed under the machine portion 11 and may be fixedly attached thereto as by means of a bolt, not shown, extending through a central opening 17 in the plate 13. As hereinafter described, the plate 13 is supported on member 14 through an arrangement by which horizontal displacements of plate 13 are translated into vertical displacements of the member 14. Diaphragm 16 is on the upper side of an oil chamber 18 and another diaphragm 19 forms the lower side of the oil chamber 18 and the upper side of an air chamber 20, the chambers 18 and 20 being defined by the diaphragms 16 and 19 and additional members described hereinafter. Both diaphragms 16 and 19 may be of suitable elastomeric or other flexible materials. It is noted that although chambers 18 and 20 are referred to as oil and air chambers, liquids or essentially incompressible fluids other than oil may be used in chamber 18 while compressible fluids other than air may be used in the lower chamber 20.

The air chamber 20 is so pressurized as to effect static support of the machine part 11 therefrom with the member 14 being in a "floating" position at an elevation as shown, which is between upper and lower limits of travel. When there is a downward or upward displacement of the member 14 in response to shocks or vibrations of the machine, the oil in chamber 18 acts as a hydraulic coupling to cause a corresponding displacement of the diaphragm 19 but of reduced magnitude due to the fact that the ratio of the effective area of piston portion 15 to that of diaphragm 19 is less than unity. As a result, a large effective compliance is obtained to minimize transmission of shocks and vibrations. At the same time, the air in the chamber 20 is highly pressurized and operates to absorb and damp oscillations of the machine portion 11. The oil in chamber 18 also acts as a damping medium, especially with regard to higher frequency components of the applied forces which cause turbulence in the oil. The overall effect is to minimize transmission of forces to the support surface 12 while damping oscillatory action of the machine portion 11.

The performance with respect to low frequency components is especially important. The ratio of the effective area of the piston portion to that of the diaphragm 19 is low to obtain a large effective compliance and thereby a low natural resonant frequency and the ratio can be matched to the requirements of a particular machine, being reduced to reduce the frequency and being increased to increase the frequency. The arrangement also permits the device to be much smaller and more compact than would be the case if an attempt were made to obtain comparable results with prior types of constructions.

Figure 3:
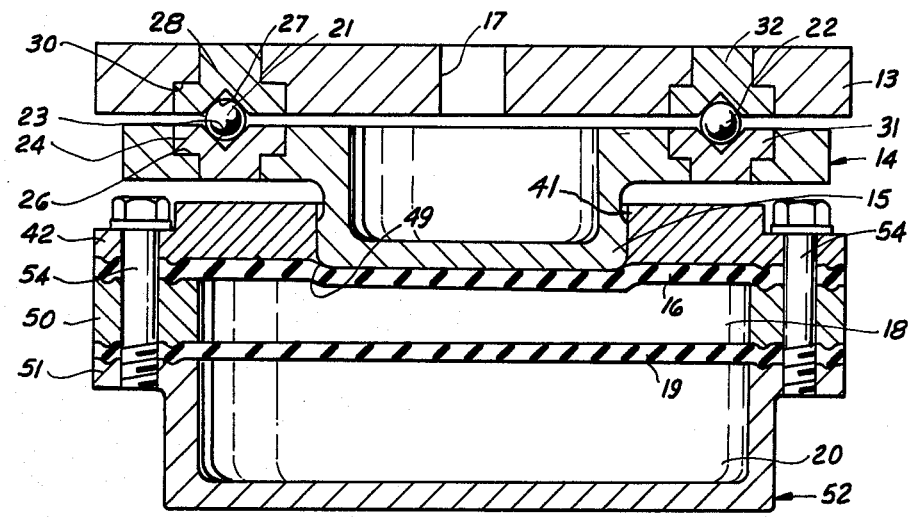
FIG. 3 is a sectional view taken substantially along line III—III of FIG. 2.

To support plate 13 from member 14, four bearing balls are provided therebetween, two of which are shown in FIG. 3 and designated by reference numerals 21 and 22. Ball 21 is seated in an upwardly facing concave surface or recess 23 in a member 24 which is secured in an opening 26 in the member 14, the member 24 and opening 26 being so formed as to provide interengaging annular shoulders. Ball 21 also engages in a downwardly facing concave surface or recess 27 in a member 28 which is secured in an opening 30 in plate 13, member 28 and opening 30 being also so formed as to provide interengaging annular shoulders. The ball 22 is similarly disposed between seat members 31 and 32 like the members 24 and 28 and the other two balls are likewise supported between similar pairs of seat members.

In operation, when the machine portion 11 is displaced horizontally, the balls roll up in the recesses in the lower seat members and the upper seat members ride upwardly relative to the balls, thereby tending to cause the machine part 11 to move upwardly and the member 14 to move downwardly. As a result, horizontal forces are translated into vertical forces which act in the same way as vertical forces applied directly from vertical movement of the machine part when the balls are seated centrally in the recesses of the seat members. In the illustrated construction the recesses in the seat members are conical with a taper of approximately 45 degrees which is desirable in most applications, but the shape and degree of taper may be changed according to the requirements imposed by a particular machine or application.

Means are provided for limiting horizontal displacement of plate 13 relative to member 14, including four hollow post members 33-36 which project upwardly from the member 14 into the centers of four collars 37-40 secured in openings in the plate 13. The collars 37-40 are preferably of elastomeric material to resiliently urge the plate 13 toward a centered position in which the balls are seated centrally in the recesses of the seat members.

Figure 4:
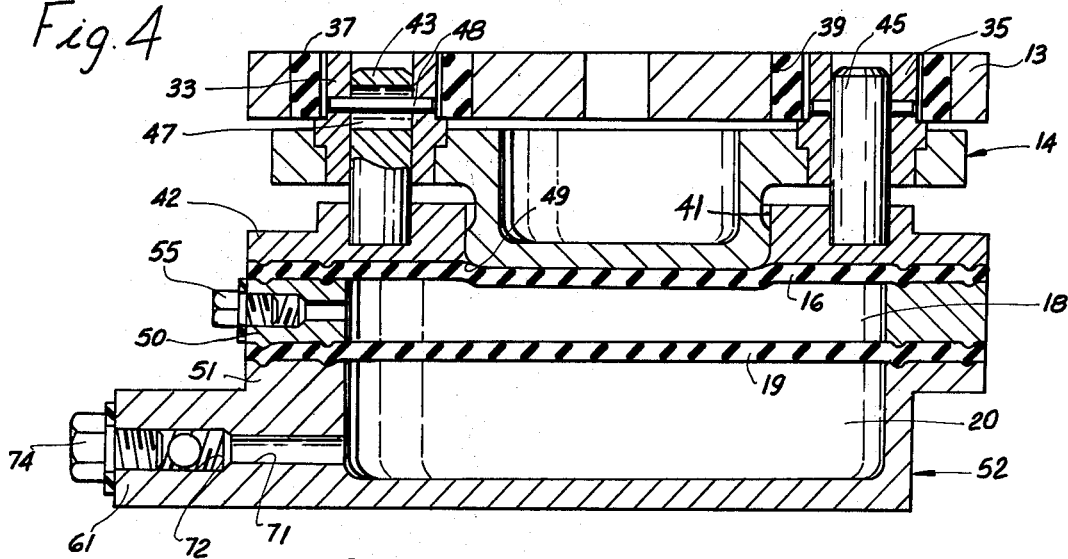
FIG. 4 is a sectional view taken substantially along line IV—IV of FIG. 2.
Figure 5:
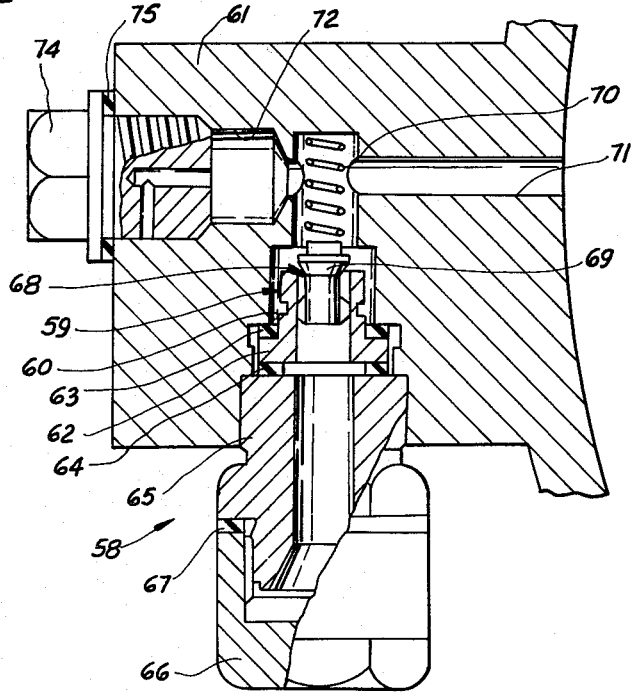
FIG. 5 is a sectional view, on an enlarged scale, taken substantially along line V—V of FIG. 1.

The member 14 is supported through a central opening 41 on a ring member 42 which is secured on top of the diaphragm 16, member 14 being so supported as to permit limited vertical movement while preventing horizontal displacement. For this purpose, four pins 43-46 are secured to the ring member 42 and extend upwardly into the hollow post members 33-36. As shown in FIG. 4, the pin 43 has a vertically extending slot 47 therein and a cross-pin 48 is secured in the hollow post member 33 to extend through the slot 47 and to limit vertical displacement of the member 14 relative to the ring member 42. Similar slots and pins are provided in the pins 44-46 and post members 34-36.

The central opening in the ring member 42 is preferably of the same size as the piston portion 15 of member 14, with only a small clearance space to provide a guiding action and to provide maximum backing for the diaphragm 16. The lower peripheral edge of the piston portion 15 is preferably rounded as indicated by reference numeral 49 so that the portion of the diaphragm engaged therewith may be bent smoothly without any shearing action.

A ring member 50 is disposed between the peripheral portions of the diaphragms 16 and 19 and is disposed over an outwardly projecting annular flange 51 at the rim of a cup-shaped member 52 which defines the air chamber 20. A plurality of bolts 54 are provided which have shank portions extending downwardly through aligned openings in the ring members 42 and 50 and which are threaded into openings in the flange 51 to squeeze the peripheral portions of the diaphragms between the parts and to obtain highly effective seals. It is noted that both diaphragms are in protected positions within the device and that the oil operates to distribute forces such as to minimize stress concentrations and the possible rupture of the diaphragms.

For filling the chamber 18 with oil, a pair of screws 55 and 56 are provided having shank portions threaded into openings in the ring member 50, one being used for admitting oil and the other being used to bleed out air. When the chamber 18 is filled with oil, the screws are threaded into the openings and tightened to obtain seals, sealing washers being preferably provided.

For supply of air into the air chamber 20, a valve unit 58 is provided including a hollow sleeve member 59 disposed in an opening 60 in an outwardly projecting portion 61 on the cup-shaped member 52, the sleeve member 59 having a flange portion 62 disposed between sealing washers 63 and 64 and sandwiched between an annular shoulder in the opening 60 and the inner end of a hollow plug 65 which is threaded or otherwise secured into the outer end of the opening 60, a cap 66 being threaded or otherwise secured on the outer end of the plug 65 against a sealing washer 67. A valve member 68 is provided having a guide portion extending outwardly within the sleeve member 59 and having a valve portion 69 adapted to seat against the inner end of the sleeve member 59, a compression spring member 70 being provided for urging the valve member 68 to a seated position. The inner end of the opening 60 communicates with the air chamber 20 through a passage 71 and also communicates with an opening 72 which is normally closed by a plug 74 threaded therein against a sealing washer 75.

In operation, the chamber 18 is filled with oil as above described and the device is disposed under a portion of a machine with plate 13 being preferably secured to the machine through a bolt extending through opening 17. Then with the cap 66 removed, pressurized air is supplied through the hollow plug 65 to flow past the valve portion 69 and through passage 71 into the chamber 20. When the member 14 is elevated to a position as shown, mid-way between the upper and lower limits of travel thereof, the supply of pressurized air is cut off, the valve is closed by the spring 70 and the cap 66 is replaced and tightly screwed on to insure a reliable seal. If it should be necessary to reduce the air pressure, the plug 74 may be partially screwed out to allow outward flow until the pressure is reduced to the desired level.

An oscillatory action is obtained through the cooperation of the mass of the supported machine and the compliance of the devices constructed in accordance with this invention. The natural resonant frequency of such an oscillatory action is a function of the mass of the supported machine and the compliance of the device, compliance being defined as the ratio of a displacement to the magnitude of an applied force and being inversely related to a stiffness factor. It can be shown by analysis that the compliance of the illustrated device is proportional to the effective area of the diaphragm 19, proportional to the depth of the chamber 20, inversely proportional to the effective area of the piston portion 15 and inversely proportional to the force exerted by the weight of the supported object. It can also be shown that the natural resonant frequency is inversely proportional to the square root of the product of mass and compliance and since the compliance of the device is inversely proportional to the weight or mass of the supported object, the natural resonant frequency is essentially independent of the weight or mass of the supported object, being determined by other factors. It is proportional to the square root of the effective area of the piston portion 15 divided by the product of the area of the diaphragm 19 and the depth of the air chamber 20. Thus to decrease the resonant frequency, the effective area of the piston portion 15 may be reduced or the volume of the chamber 20 may be increased either by increasing the area of the diaphragm 19 or increasing the depth of the chamber 20. Accordingly, the device can be constructed to obtain a desired resonant frequency and to match the requirements of a particular machine by using the appropriate piston size. It is also noted that with a given volume and hence with a given overall size, the natural resonant frequency can be reduced to a low value by simply reducing the area of the piston portion 15. Also, the required size of device to produce a given resonant frequency can be reduced by decreasing the ratio of the area of the piston portion 15 to the area of the diaphragm 19 and the depth of the air chamber 20.

The hydraulic arrangement is a particularly advantageous form of a displacement multiplying means because of its simplicity and also because the oil provides a damping action especially with respect to higher frequency components of the applied shock or vibration forces.

It will be understood that modifications and variations may be effected without departing from the spirit and scope of the novel concepts of this invention.

We claim as our invention:

1. In a device for supporting a machine or the like from a support surface, compressible fluid chamber means arranged for disposition on the support surface and defining a chamber for receiving a compressible fluid, said fluid chamber means including flexible diaphragm means defining an upper wall portion thereof, coupling means for transmitting forces from the machine to said diaphragm means, means for injecting a compressible fluid into said compressible fluid chamber to develop a certain static pressure therein, said coupling means comprising a piston element arranged to be coupled to the machine and means defining a closed liquid chamber for transmission of pressure from said piston element to said diaphragm means, and second diaphragm means engaged by said piston element and cooperating with the first diaphragm means in defining said liquid chamber.

2. In a device as defined in claim 1, said piston element having an area which is substantially less than that of said diaphragm means to provide an increased effective compliance.

3. In a device as defined in claim 1, said compressible fluid chamber means comprising a generally cup-shaped member having a peripheral rim portion disposed under the underside of a peripheral portion of said first diaphragm means, a first annular member disposed over said peripheral portion of said first diaphragm means and disposed under a peripheral portion of said second diaphragm means, and a second annular member disposed over and engaged with the upper side of said peripheral portion of said second diaphragm means.

4. In a device as defined in claim 3, means on said second annular member for operating as a guide for vertical displacement of said piston element.

5. In a device as defined in claim 4, means on said second annular member and on said piston effective for limiting vertical displacement of said piston element.

6. In a device as defined in claim 1, said piston element being displaceable in a vertical direction and said coupling means being arranged to translate horizontal displacement of the machine into vertical displacement of said piston element.

7. In a device as defined in claim 6, said coupling means comprising means on said piston element defining a plurality of upwardly facing recesses, means arranged to be connected to the machine and defining a plurality of downwardly facing recesses in general alignment with said upwardly facing recesses, and a plurality of balls between said aligned upwardly and downwardly facing recesses.

* * * * *